US012523359B2

(12) United States Patent
Lin et al.

(10) Patent No.: US 12,523,359 B2
(45) Date of Patent: Jan. 13, 2026

(54) DUAL-PURPOSE MOUNTING MODE CEILING LAMP MOUNTING DEVICE

(71) Applicant: Xiamen Topstar Lighting Co., Ltd., Xiamen (CN)

(72) Inventors: Xibin Lin, Xiamen (CN); Haipeng Hong, Xiamen (CN); Chuanbao Ye, Xiamen (CN); Bin Shen, Xiamen (CN); Yixian Zheng, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 19/008,019

(22) Filed: Jan. 2, 2025

(65) Prior Publication Data

US 2025/0137625 A1 May 1, 2025

(30) Foreign Application Priority Data

Nov. 26, 2024 (CN) ......................... 202422890238.8

(51) Int. Cl.
*F21V 21/04* (2006.01)
*F21S 8/02* (2006.01)
*F21V 23/00* (2015.01)

(52) U.S. Cl.
CPC ............ *F21V 21/047* (2013.01); *F21S 8/026* (2013.01); *F21V 23/001* (2013.01)

(58) Field of Classification Search
CPC ....... F21V 23/001; F21V 21/044; F21S 8/026
USPC .................................................. 362/365, 148
See application file for complete search history.

(56) References Cited

U.S. PATENT DOCUMENTS

| | | | | |
|---|---|---|---|---|
| 10,731,830 B2 * | 8/2020 | Feit | F21S 8/036 | |
| 2020/0400292 A1 * | 12/2020 | Elmvang | F21V 21/14 | |
| 2023/0228392 A1 * | 7/2023 | Presz-Lafreniere | F21S 8/026 362/147 | |

FOREIGN PATENT DOCUMENTS

CN 210319898 U * 4/2020

OTHER PUBLICATIONS

Search translation of CN 210319898 U (Year: 2020).*

* cited by examiner

*Primary Examiner* — Laura K Tso
(74) *Attorney, Agent, or Firm* — Westbridge IP LLC

(57) ABSTRACT

A dual-purpose mounting mode ceiling lamp mounting device includes a main body bracket and two groups of connecting assemblies. The main body bracket is strip-shaped; the main body bracket is provided with a J-BOX connection hole; ends of the connecting assemblies are detachably connected with the main body bracket, and two groups of the connecting assemblies are respectively slidably provided at two ends of the main body bracket, the sliding direction is a length direction of the main body bracket; the other ends of the connecting assemblies are configured to connect with an external structure. The main body bracket is provided with detachable connecting assemblies and a J-BOX connection hole, when it is necessary to mount the ceiling lamp in the J-BOX mode, the connecting assembly can be disassembled from the main body bracket to mount the ceiling lamp in the J-BOX mode.

8 Claims, 3 Drawing Sheets

DUAL-PURPOSE MOUNTING MODE CEILING LAMP MOUNTING DEVICE

CROSS-REFERENCE TO RELATED APPLICATIONS

This application claims priority to Chinese Patent Application No. 202422890238.8, filed on Nov. 26, 2024, the content of which is incorporated herein by reference in its entirety.

TECHNICAL FIELD

The application relates to the technical field of lamp mounting, and in particular to a dual-purpose mounting mode ceiling lamp mounting device.

BACKGROUND

The existing ceiling lamps include a type mounted in junction box mode or a type mounted in free hole opening mode of building, different mounting modes correspond to different lamp designs, so it is impossible to share products. Although some of the ceiling lamps adopt dual-purpose mounting mode, the mounting process is cumbersome and hole opening only can be carried out for a specific size, which makes the assembly difficult.

SUMMARY

The technical problem to be solved by the application is: a dual-purpose mounting mode ceiling lamp mounting device is provided, so that a user can more conveniently mount a ceiling lamp by two mounting modes.

In order to solve the above technical problem, the technical solution adopted by the application is as follows.

A dual-purpose mounting mode ceiling lamp mounting device includes a main body bracket and two connecting assemblies; the main body bracket is flat and substantially rectangular with protrusions at a middle portion thereof extending outward in a width direction; the main body bracket is provided with a junction box connection hole; one end of each of the two connecting assemblies is detachably connected with the main body bracket, and two connecting assemblies are respectively slidably provided at two ends of the main body bracket, the sliding direction being a length direction of the main body bracket; and another end of each of the two connecting assemblies is configured to connect with an external structure.

Further, the connecting assemblies include a sliding seat, a spring member, and a connecting rod; a bottom of the sliding seat is detachably connected with the main body bracket, and is slidably provided on the main body bracket; the spring member is provided at one end of the sliding seat away from the main body bracket; a first end of the spring member is rotatable relative to the sliding seat, and is in limit abutment with the sliding seat in a default state; a second end of the spring member is connected with the connecting rod; and the connecting rod is configured to connect with an external structure.

Further, the main body bracket is provided with a sliding rail; the bottom of the sliding seat is provided with a sliding block; the sliding block is detachably connected with the sliding rail, and the sliding block is slidably provided within the sliding rail.

Further, one end of the sliding rail is provided with a placing groove, and a width of the placing groove is greater than the width of the sliding rail; a side wall of the sliding block is provided with a limiting portion, and a width of the limiting portion is less than the width of the placing groove and greater than the width of the sliding rail.

Further, the sliding rail is provided with a scale mark.

Further, both ends of the main body bracket are provided with connecting portions; and the connecting portions are configured to connect with a lamp to be mounted.

Further, the connecting portion includes an inverted "U" shaped hook.

Further, the connecting portion includes an inverted "L" shaped hook.

Further, the main body bracket is further provided with a junction box mounting portion; and the junction box mounting portion is configured to connect with a junction box.

Further, the main body bracket is further provided with a fixing hole; and the fixing hole is configured to fix the main body bracket on an external structure.

The beneficial effects of the application are: the main body bracket being provided with detachable connecting assemblies, and the two groups of connecting assemblies being slidable in the length direction of the main body bracket, so that a user can select an appropriate connecting assembly position within a certain range to meet the requirements of hole opening mounting; at the same time, the main body bracket is further provided with a junction box connection hole, and when it is necessary to mount the ceiling lamp in the junction box mode, the connecting assembly can be disassembled from the main body bracket to mount the ceiling lamp in the junction box mode; and thus, the lamps can be mounted in two mounting modes at the same time.

DETAILED DESCRIPTION OF THE EMBODIMENTS

Figure 1:
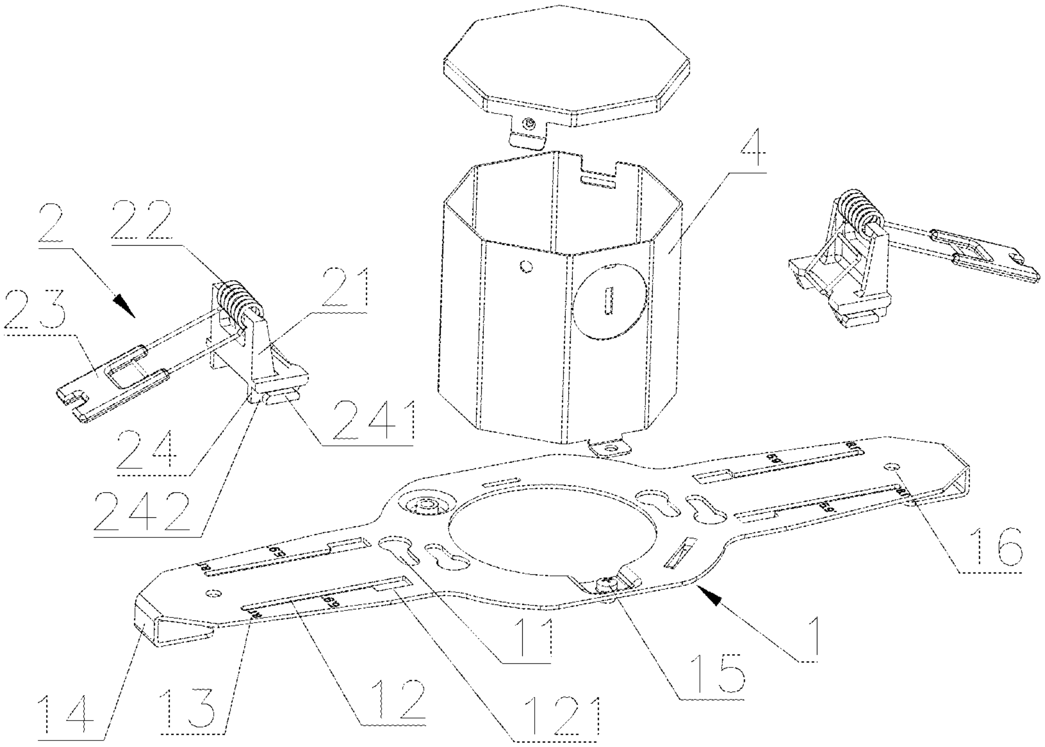
FIG. 1 is a structure schematic view of a dual-purpose mounting mode ceiling lamp mounting device in the example of the application.

In order to explain the technical contents, the objects, and the effects of the application in detail, the embodiments will be described below with reference to the accompanying drawings.

A dual-purpose mounting mode ceiling lamp mounting device includes a main body bracket and two connecting assemblies; the main body bracket is flat and substantially rectangular with protrusions at a middle portion thereof extending outward in a width direction; the main body bracket is provided with a junction box connection hole; one end of each of the two connecting assemblies is detachably connected with the main body bracket, and two connecting assemblies are respectively slidably provided at two ends of the main body bracket, the sliding direction being a length direction of the main body bracket; and another end of each of the two connecting assemblies is configured to connect with an external structure.

It can be seen from the above-mentioned description that the beneficial effects of the application are as follows. The main body bracket is provided with detachable connecting assemblies, and the two connecting assemblies being slidable in the length direction of the main body bracket, so that a user can select an appropriate connecting assembly position within a certain range to meet the requirements of hole opening mounting; at the same time, the main body bracket is also provided with a junction box connection hole, and when it is necessary to mount the ceiling lamp in the junction box mode, the connecting assembly can be disassembled from the main body bracket to mount the ceiling lamp in the junction box mode; and thus, the lamps can be mounted in two mounting modes at the same time.

Further, the connecting assemblies include a sliding seat, a spring member, and a connecting rod; a bottom of the sliding seat is detachably connected with the main body bracket, and is slidably provided on the main body bracket; the spring member is provided at one end of the sliding seat away from the main body bracket; a first end of the spring member is rotatable relative to the sliding seat, and is in limit abutment with the sliding seat in a default state; a second end of the spring member is connected with the connecting rod; and the connecting rod is configured to connect with an external structure.

It can be seen from the above-mentioned description that an integrated spring connecting assembly is composed of a sliding seat, a spring member and a connecting rod, and the movement or limiting of the sliding seat can be controlled by the spring member having a rotation characteristic so as to adjust the position of the connecting assembly on the main body bracket, and the main body bracket is connected with an external structure such as an hole opening of a ceiling via the connecting rod.

Further, the main body bracket is provided with a sliding rail; the bottom of the sliding seat is provided with a sliding block; the sliding block is detachably connected with the sliding rail, and the sliding block is slidably provided within the sliding rail.

It can be seen from the above-mentioned description that by providing a sliding rail on the main body bracket, and providing a sliding block on the bottom of the sliding seat, the function of adjusting the position of the connecting assembly on the main body bracket is achieved by the sliding fit of the sliding block and the sliding rail.

Further, one end of the sliding rail is provided with a placing groove, and a width of the placing groove is greater than the width of the sliding rail; a side wall of the sliding block is provided with a limiting portion, and a width of the limiting portion is less than the width of the placing groove and greater than the width of the sliding rail.

It can be seen from the above-mentioned description that by providing a placing groove on the sliding rail, and the width of the placing groove being greater than the width of the sliding rail, and providing a limiting portion on the side wall of the sliding block, the sliding seat is detachably connected with the main body bracket via the placing groove, and the sliding seat cannot fall off when sliding on the main body bracket via the limiting portion.

Further, the sliding rail is provided with a scale mark.

It can be seen from the above-mentioned description that by providing a scale mark on the sliding rail, the position of the connecting assembly can be adjusted based on the scale mark, so as to improve the accuracy of setting the position of the connecting assembly; for example, after the connecting assembly is moved to a corresponding position according to the position of the hole opening of the ceiling, the connecting assembly is mounted with the hole opening of the ceiling.

Further, both ends of the main body bracket are provided with connecting portions; and the connecting portions are configured to connect with a lamp to be mounted.

It can be seen from the above-mentioned description that by providing connecting portions at both ends of the main body bracket, the main body bracket can be connected with the lamp to be mounted via the connecting portions.

Further, the connecting portion includes an inverted "U" shaped hook.

It can be seen from the above-mentioned description that the connection between the main body bracket and the lamp is achieved by providing the connecting portion as an inverted 'U' shaped snap hook so that the connecting portion can cooperate with the snap structure on the lamp. Further, the connecting portion includes an inverted "L" shaped hook.

It can be seen from the above-mentioned description that the connection between the main body bracket and the lamp is achieved by providing the connecting portion as an inverted "L" shaped snap hook so that the connecting portion can cooperate with the snap groove structure on the lamp.

Further, the main body bracket is further provided with a junction box mounting portion; and the junction box mounting portion is configured to connect with the junction box.

It can be seen from the above-mentioned description that by providing the junction box mounting portion on the main body bracket, the connection between the main body bracket and the junction box is achieved by the junction box mounting portion.

Further, the main body bracket is further provided with a fixing hole; and the fixing hole is configured to fix the main body bracket on an external structure.

It can be seen from the above-mentioned description that the main body bracket can be fixed on a wall structure such as a ceiling or the like by providing a fixing hole on the main body bracket so as to cooperate with a connection structure such as a screw or the like through the fixing hole, which is convenient for a user to disassemble.

The dual-purpose mounting mode ceiling lamp mounting device provided in the application can be applied to different lighting scenes, such as bathrooms, rooms, corridors and the like, and the following description is provided by way of specific embodiments.

Example 1

Figure 2:
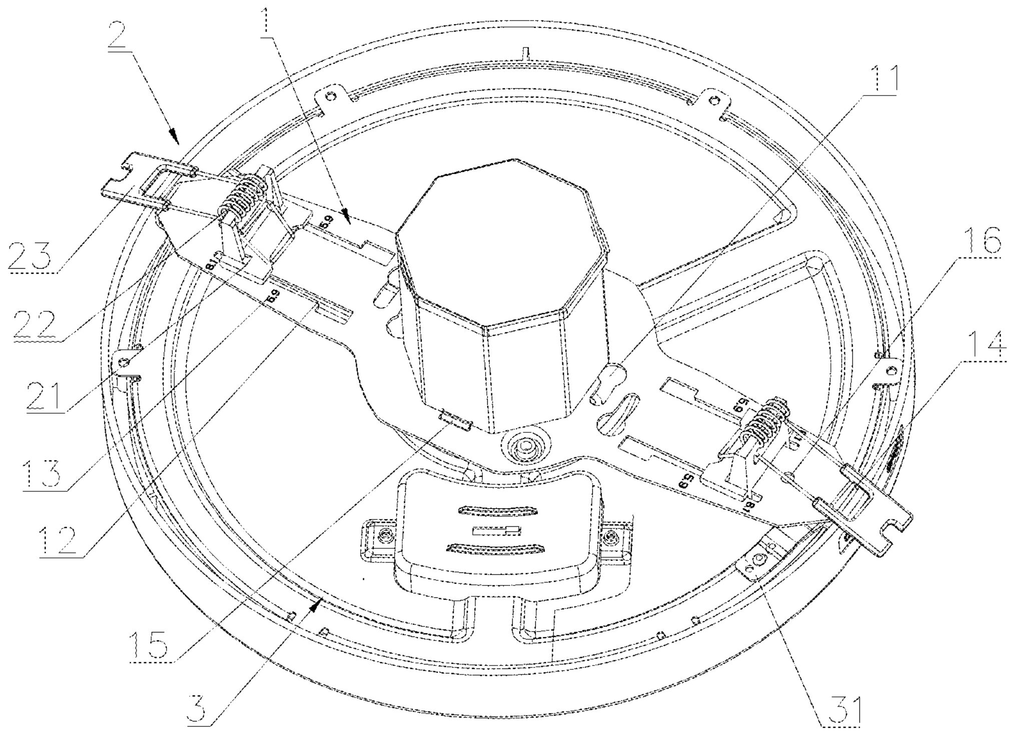
FIG. 2 is a schematic view showing the connection between the dual-purpose mounting mode ceiling lamp mounting device and a lamp via a connecting assembly in the example of the application.
Figure 3:
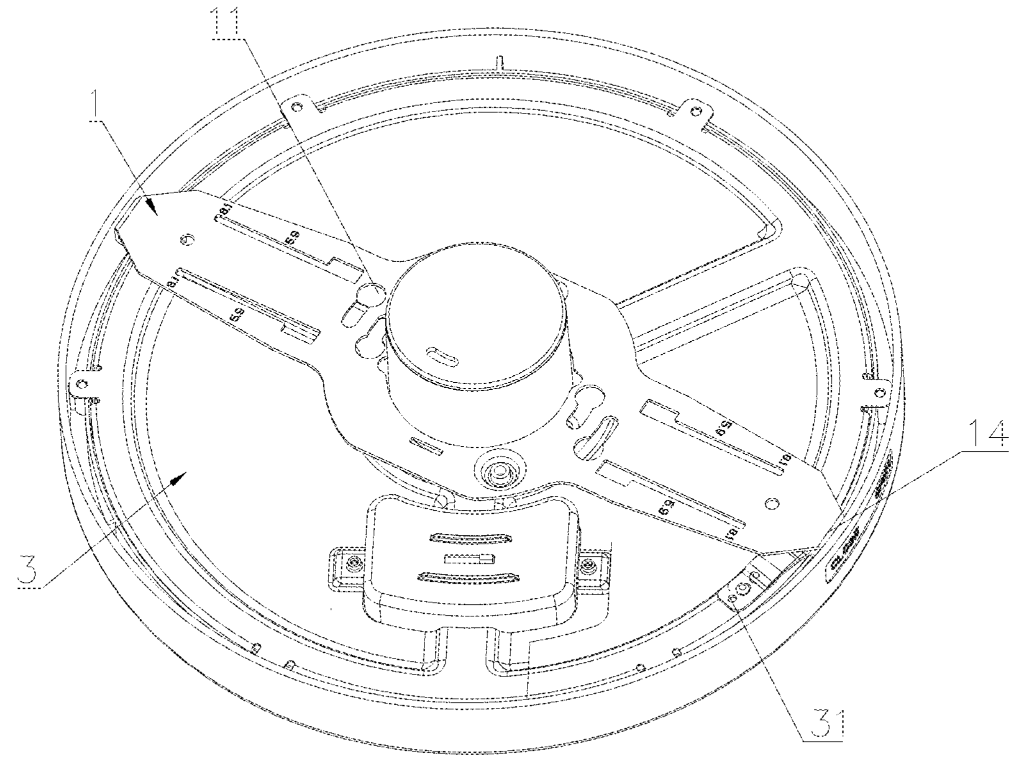
FIG. 3 is a schematic view showing the connection between the dual-purpose mounting mode ceiling lamp mounting device and a lamp via a junction box in the example of the application.

With reference to FIG. 1, a dual-purpose mounting mode ceiling lamp mounting device includes a main body bracket 1 and two groups of connecting assemblies 2; the main body bracket 1 is flat and substantially rectangular with protrusions at a middle portion thereof extending outward in a width direction, so as to reduce the area and weight of the main body bracket 1, which is more conducive to user mounting; the two ends of the main body bracket 1 are both provided with a connecting portion 14; the connecting portion 14 is configured to connect with the lamp 3 to be mounted; the main body bracket 1 is provided with a junction box connection hole 11, so that a user can mount the lamp 3 in a junction box mode, and the connection mode is as shown in FIG. 3; one end of the connecting assembly 2 is detachably connected with the main body bracket 1, and two connecting assemblies 2 are respectively slidably provided at two ends of the main body bracket 1, with the sliding direction being the length direction of the main body bracket 1, so that a user can select a suitable position of the connecting assembly 2 within a certain range to meet the requirements of hole opening mounting; the other end of the connecting assembly 2 is configured to connect with an external structure, such as a hole opening in a ceiling, in the mode shown in FIG. 2. The main body bracket 1 is further provided with a junction box mounting portion 15 for connecting with the junction box 4, and a fixing hole 16 for fixing the main body bracket 1 to an external structure.

The main body bracket 1 is provided with a sliding rail 12, one end of the sliding rail 12 is provided with a placing groove 121, and the width of the placing groove 121 is greater than the width of the sliding rail 12; at the same time, a scale mark 13 is provided on the sliding rail 12; the connecting assembly 2 includes a sliding seat 21, a spring member 22 and a connecting rod 23; the bottom of the sliding seat 21 is detachably connected with the main body bracket 1 and is slidably provided on the main body bracket 1; the spring member 22 is provided at one end of the sliding seat 21 away from the main body bracket 1; the first end of the spring member 22 can rotate relative to the sliding seat 21, and is in limited abutment with the sliding seat 21 in a default state; the second end of the spring member 22 is connected with the connecting rod 23; the connecting rod 23 is configured to connect with an external structure; the bottom of the sliding seat 21 is provided with a sliding block 24; the sliding block 24 is detachably connected with the sliding rail 12, and the sliding block 24 is slidably provided in the sliding rail 12; one end of the sliding rail 12 is provided with a placing groove 121, and the width of the placing groove 121 is greater than the width of the sliding rail 12; a limiting portion 241 is provided on the side wall 242 of the sliding block 24, and the width of the limiting portion 241 is less than the width of the placing groove 121 and greater than the width of the sliding rail 12.

The specific mounting mode of the main body bracket 1 and the connecting assembly 2 is as follows.

After the sliding seat 21 is put into the sliding rail 12 via the placing groove 121, a limiting function is played on the sliding seat 21 via the limiting portion 241, so that the connecting assembly 2 can only move in the direction of the sliding rail 12, namely, can only move in the length direction of the main body bracket 1; when it is necessary to move the connecting assembly 2, by pressing the spring member 22, the first end of the spring member 22 is tilted to release the limiting position of the sliding seat 21; when the pressure is not applied, the first end of the spring member 22 is automatically pressed by the elastic force to limit the sliding seat 21, thereby fixing the sliding seat 21.

Referring to FIG. 1, in an alternative embodiment, the connecting portion 14 is an inverted "U" shaped snap hook for structural connection with a snap 31 on the lamp 3; the specific connection mode is as shown in FIGS. 2 and 3, after the main body bracket 1 is integrally provided on the lamp 3, the main body bracket 1 is rotated, and the "U" shaped snap hook on the main body bracket 1 is snap-connected with the snap 31 on the lamp 3. The snap 31 can be an iron sheet with a certain height, thereby limiting the snap hook between the iron sheet and the lamp 3.

In addition, with regard to a common non-ultra-thin ceiling lamp design, the main body bracket 1 can be directly fixed on the upper end of the chassis of the lamp 3, and when it is necessary to mount same by the junction box, the connecting assembly 2 can be directly assembled after being disassembled, and the mounting structure is as shown in FIG. 3. In surface mounting, the main body bracket 1 is fixed to the ceiling via the connecting rod 23 after adjusting the position of the connecting assembly 2 on the sliding rail 12, and then the lamp 3 is rotatably connected with the main body bracket 1, and the mounting structure is as shown in FIG. 2.

Figure 4:
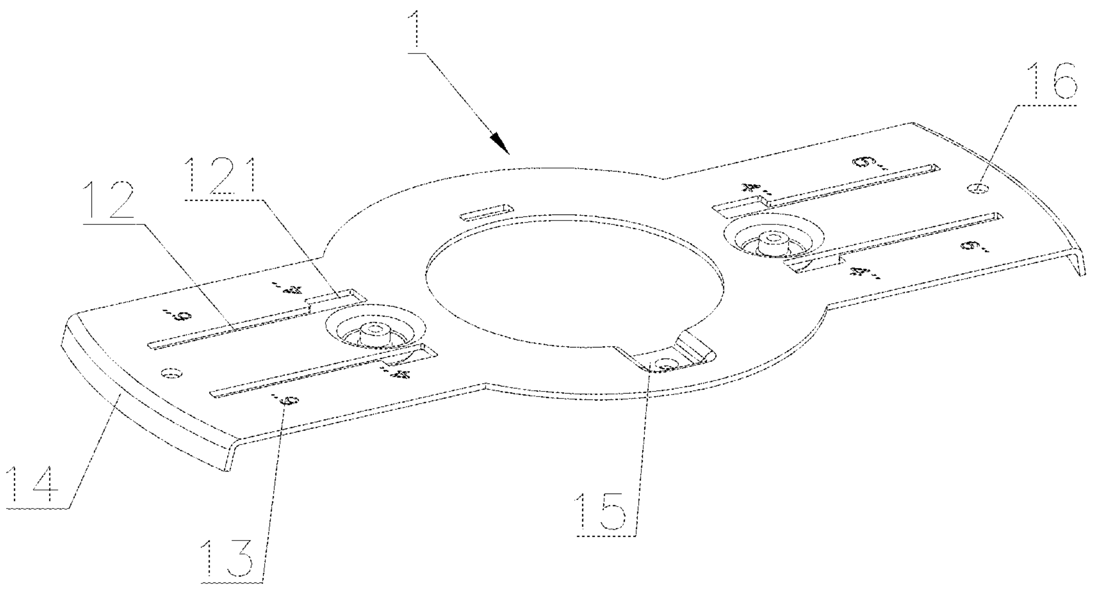
FIG. 4 is a structure schematic view of another main body bracket in the example of the application.
Figure 5:
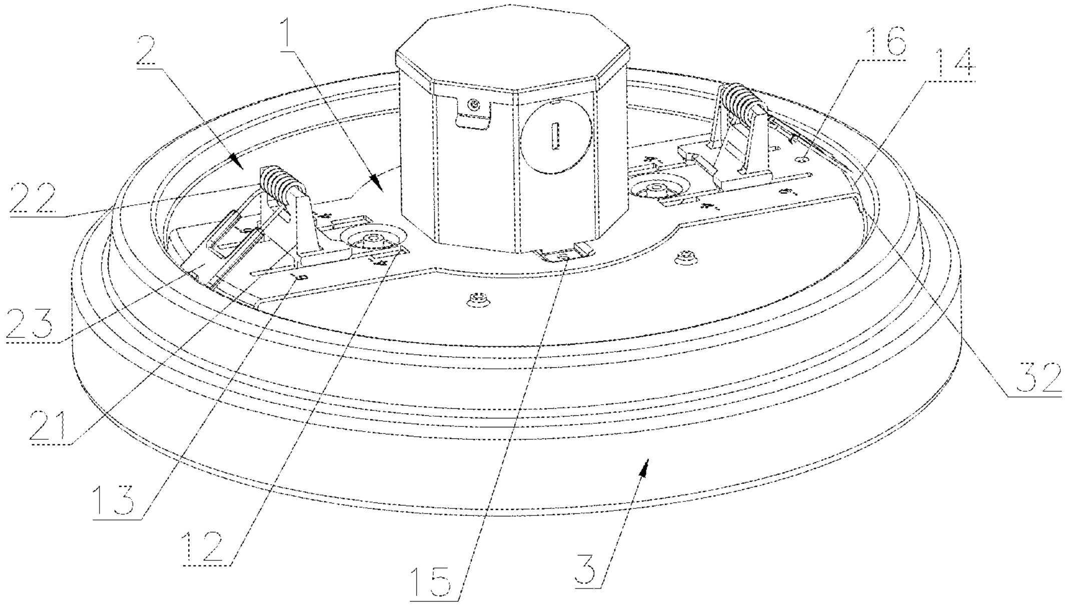
FIG. 5 is a schematic view showing the connection between another dual-purpose mounting mode ceiling lamp mounting device and a lamp via a connecting assembly in the example of the application.
Figure 6:
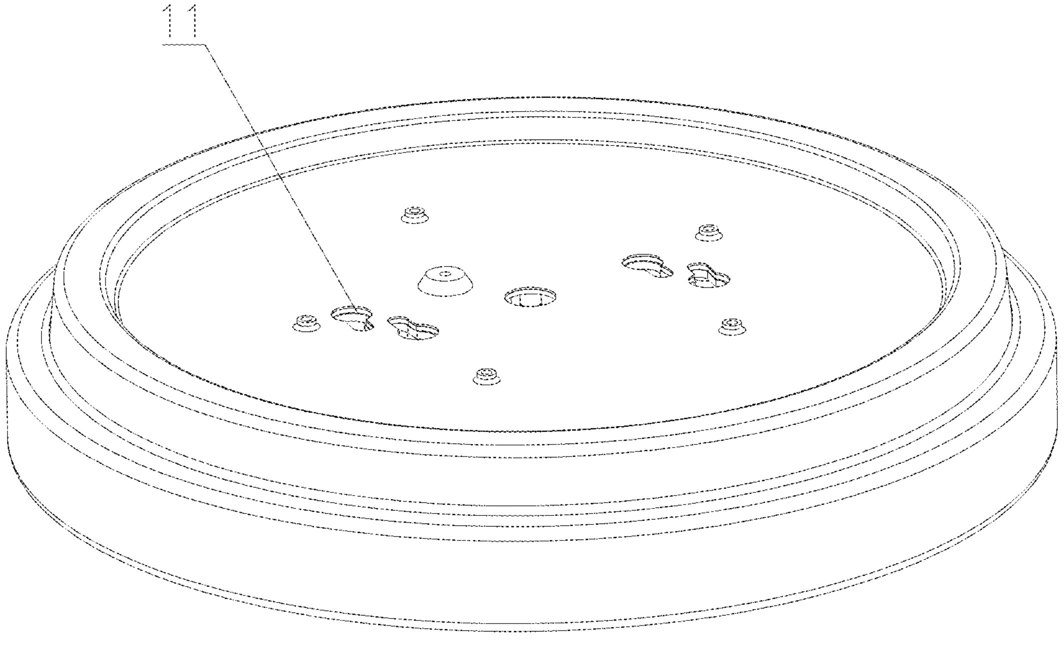
FIG. 6 is a schematic view of a lamp mounted via a junction box mode in the example of the application.

Referring to FIG. 4, in an alternative embodiment, the connecting portion 14 is formed as an inverted "L" shaped snap hook for structural connection with a snap groove 32 on the lamp 3; the specific connection mode is as shown in FIG. 5; when the lamp body is provided with a junction box hole and is mounted in a junction box mode, it is not necessary to mount the lamp body through the main body bracket 1, as shown in FIG. 6. Furthermore, when the lamp body is provided with a junction box hole, it can be seen that the junction box connection hole 11 on the main body bracket 1 is removed, as shown in FIG. 4.

The above-mentioned description is only an example of the application, and is not intended to limit the scope of the application, and all equivalent transformation performed by using the contents of the specification and the drawings of the application or directly or indirectly applied to the related technical fields are included in the scope of the application.

What is claimed is:

1. A dual-purpose mounting mode ceiling lamp mounting device, comprising a main body bracket and two connecting assemblies; wherein the main body bracket is flat and substantially rectangular with protrusions at a middle portion thereof extending outward in a width direction;

the main body bracket is provided with a junction box connection hole;

end of each of the two connecting assemblies is detachably connected with the main body bracket, and the two connecting assemblies are respectively slidably provided at two ends of the main body bracket, the sliding direction is a length direction of the main body bracket; and another end of each of the two connecting assemblies is configured to connect with an external structure;

each of the two connecting assemblies comprises a sliding seat, a spring member, and a connecting rod;

a bottom of the sliding seat is detachably connected with the main body bracket, and is slidably provided on the main body bracket;

the spring member is provided at one end of the sliding seat away from the main body bracket;

a first end of the spring member is rotatable relative to the sliding seat, and is in limit abutment with the sliding seat in a default state;

a second end of the spring member is connected with the connecting rod; the connecting rod is configured to connect with an external structure;

the main body bracket is provided with a sliding rail;

the bottom of the sliding seat is provided with a sliding block;

the sliding block is detachably connected with the sliding rail, and the sliding block is slidably provided within the sliding rail;

one end of the sliding rail is provided with a placing groove, and a width of the placing groove is greater than a width of the sliding rail; and a side wall of the sliding block is provided with a limiting portion, and a width of the limiting portion is less than the width of the placing groove and greater than the width of the sliding rail.

2. The dual-purpose mounting mode ceiling lamp mounting device according to claim 1, wherein the sliding rail is provided with a scale mark.

3. The dual-purpose mounting mode ceiling lamp mounting device according to claim 1, wherein the sliding rail is provided with a scale mark.

4. The dual-purpose mounting mode ceiling lamp mounting device according to claim 1, wherein both ends of the main body bracket are provided with connecting portions; and the connecting portions are configured to connect with a lamp to be mounted.

5. The dual-purpose mounting mode ceiling lamp mounting device according to claim 4, wherein the connecting portions comprise an inverted “U” shaped hook.

6. The dual-purpose mounting mode ceiling lamp mounting device according to claim 4, wherein the connecting portions comprise an inverted “L” shaped hook.

7. The dual-purpose mounting mode ceiling lamp mounting device according to claim 1, wherein the main body bracket is further provided with a junction box mounting portion; and the junction box mounting portion is configured to connect with a junction box.

8. The dual-purpose mounting mode ceiling lamp mounting device according to claim 1, wherein the main body bracket is further provided with a fixing hole; and the fixing hole is configured to fix the main body bracket on the external structure.

* * * * *